US009208666B2

(12) United States Patent
Jackson

(10) Patent No.: US 9,208,666 B2
(45) Date of Patent: *Dec. 8, 2015

(54) AUTOMATED, REMOTELY-VERIFIED ALARM SYSTEM WITH INTRUSION AND VIDEO SURVEILLANCE AND DIGITAL VIDEO RECORDING

(71) Applicant: CheckVideo LLC, Falls Church, VA (US)

(72) Inventor: Randall R. Jackson, Atlanta, GA (US)

(73) Assignee: CheckVideo LLC, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,624

(22) Filed: Jul. 3, 2014

(65) Prior Publication Data

US 2014/0321706 A1     Oct. 30, 2014

Related U.S. Application Data

(63) Continuation of application No. 14/246,700, filed on Apr. 7, 2014, which is a continuation of application No. 13/716,777, filed on Dec. 17, 2012, now abandoned, which is a continuation of application No.

(Continued)

(51) Int. Cl.
*G08G 1/00* (2006.01)
*G08B 13/196* (2006.01)
(Continued)

(52) U.S. Cl.
CPC .............. *G08B 13/196* (2013.01); *G06T 7/004* (2013.01); *G08B 13/19602* (2013.01);
(Continued)

(58) Field of Classification Search
USPC ................. 340/506, 517, 521, 539.1, 539.11, 340/539.25, 539.26, 541, 6.1
See application file for complete search history.

(56) References Cited

U.S. PATENT DOCUMENTS

| 4,857,912 A | 8/1989 | Everett, Jr. et al. |
| 5,486,819 A | 1/1996 | Horie |

(Continued)

FOREIGN PATENT DOCUMENTS

| WO | WO 03/026305 | 3/2003 |
| WO | WO 2006/034135 | 3/2006 |

(Continued)

OTHER PUBLICATIONS

International Search Report and Written Opinion for International Application No. PCT/US2008/084835, mailed Feb. 4, 2009.

(Continued)

*Primary Examiner* — Daryl Pope

(57) ABSTRACT

An automated self-monitored alarm verification solution including at least a premises portion, a server portion, and an end user device portion. Alarm verification includes capturing by an image capture device at least one image in response to a detection event, and transmitting a first data signal including the image to a local signal processing device. The signal processing device transmits a second signal including at least a portion of the image to a remote hosted server according to at least a first set of predetermined parameters. After receiving the second signal, the server transmits a third signal including at least a portion of the image from the hosted server to a user device. Using the user device, a user views the image and indicates a validity status of the alarm based at least in part on the content of the image. Based at least upon either the validation status indicated by the user, or upon a failure to receive a message including a validation status from the user within a predetermined duration of time, the server portion may send an alarm signal to an emergency response service.

22 Claims, 7 Drawing Sheets

Related U.S. Application Data

13/083,635, filed on Apr. 11, 2011, now Pat. No. 8,334,763, which is a continuation of application No. 11/803,851, filed on May 15, 2007, now Pat. No. 7,956,735.

(60) Provisional application No. 60/800,505, filed on May 15, 2006, provisional application No. 60/800,504, filed on May 15, 2006.

(51) Int. Cl.
*G08B 25/00* (2006.01)
*H04N 7/18* (2006.01)
*G08B 29/00* (2006.01)
*G06T 7/00* (2006.01)

(52) U.S. Cl.
CPC ... *G08B 13/19656* (2013.01); *G08B 13/19663* (2013.01); *G08B 13/19669* (2013.01); *G08B 13/19684* (2013.01); *G08B 13/19695* (2013.01); *G08B 25/008* (2013.01); *G08B 25/009* (2013.01); *G08B 29/00* (2013.01); *H04N 7/18* (2013.01)

(56) References Cited

U.S. PATENT DOCUMENTS

| | | | |
|---|---|---|---|
| 5,708,423 | A | 1/1998 | Ghaffari et al. |
| 5,712,830 | A | 1/1998 | Ross et al. |
| 5,801,618 | A | 9/1998 | Jenkins |
| 5,809,161 | A | 9/1998 | Auty et al. |
| 5,875,305 | A | 2/1999 | Winter et al. |
| 5,956,716 | A | 9/1999 | Kenner et al. |
| 6,069,655 | A | 5/2000 | Seeley et al. |
| 6,091,771 | A | 7/2000 | Seeley et al. |
| 6,094,134 | A | 7/2000 | Cohen |
| 6,154,133 | A | 11/2000 | Ross et al. |
| 6,400,265 | B1 | 6/2002 | Saylor et al. |
| 6,464,140 | B1 | 10/2002 | Weigel |
| 6,618,074 | B1 | 9/2003 | Seeley et al. |
| 6,625,383 | B1 | 9/2003 | Wakimoto et al. |
| 6,842,193 | B2 | 1/2005 | Shimose |
| 6,940,998 | B2 | 9/2005 | Garoutte |
| 6,956,599 | B2 | 10/2005 | Lim et al. |
| 6,975,220 | B1 | 12/2005 | Foodman et al. |
| 7,015,806 | B2 | 3/2006 | Naidoo et al. |
| 7,050,631 | B2 | 5/2006 | Bian et al. |
| 7,106,193 | B2 | 9/2006 | Kovach |
| 7,113,090 | B1* | 9/2006 | Saylor et al. ............ 340/539.18 |
| 7,203,620 | B2 | 4/2007 | Li |
| 7,209,035 | B2 | 4/2007 | Tabankin et al. |
| 7,262,690 | B2 | 8/2007 | Heaton et al. |
| 7,342,489 | B1 | 3/2008 | Milinusic et al. |
| 7,403,116 | B2 | 7/2008 | Bittner |
| 7,450,172 | B2 | 11/2008 | Lee et al. |
| 7,460,148 | B1 | 12/2008 | Clark et al. |
| 7,486,183 | B2 | 2/2009 | Luebke et al. |
| 7,555,146 | B2 | 6/2009 | Huang et al. |
| 7,612,666 | B2 | 11/2009 | Badawy |
| 7,636,121 | B2 | 12/2009 | Matsumoto et al. |
| 7,679,507 | B2 | 3/2010 | Babich et al. |
| 7,760,908 | B2* | 7/2010 | Curtner et al. ............ 382/103 |
| 7,847,820 | B2 | 12/2010 | Vallone et al. |
| 7,859,591 | B2 | 12/2010 | Tanaka et al. |
| 7,956,735 | B2* | 6/2011 | Jackson ............ 340/506 |
| 8,204,273 | B2 | 6/2012 | Chambers et al. |
| 8,334,763 | B2 | 12/2012 | Jackson |
| 8,520,072 | B1 | 8/2013 | Slavin et al. |
| 8,675,071 | B2 | 3/2014 | Slavin et al. |
| 2002/0067258 | A1 | 6/2002 | Lyons et al. |
| 2003/0081836 | A1 | 5/2003 | Averbuch et al. |
| 2003/0164764 | A1 | 9/2003 | Lyons et al. |
| 2004/0086091 | A1 | 5/2004 | Naidoo et al. |
| 2004/0143602 | A1 | 7/2004 | Ruiz et al. |
| 2004/0145468 | A1* | 7/2004 | La et al. ............ 340/531 |
| 2004/0183668 | A1 | 9/2004 | Campbell et al. |
| 2005/0091311 | A1 | 4/2005 | Lund et al. |
| 2005/0132414 | A1 | 6/2005 | Bentley et al. |
| 2005/0132424 | A1 | 6/2005 | Lowe et al. |
| 2005/0134450 | A1 | 6/2005 | Kovach |
| 2005/0262519 | A1* | 11/2005 | Luebke et al. ............ 719/318 |
| 2006/0041330 | A1 | 2/2006 | Ansari et al. |
| 2006/0093190 | A1 | 5/2006 | Cheng et al. |
| 2006/0165386 | A1 | 7/2006 | Garoutte |
| 2006/0167595 | A1 | 7/2006 | Breed et al. |
| 2006/0195569 | A1 | 8/2006 | Barker |
| 2006/0227997 | A1* | 10/2006 | Au et al. ............ 382/103 |
| 2006/0232673 | A1 | 10/2006 | Lipton et al. |
| 2007/0002141 | A1 | 1/2007 | Lipton et al. |
| 2007/0094716 | A1 | 4/2007 | Farino et al. |
| 2007/0136743 | A1 | 6/2007 | Hasek et al. |
| 2007/0152807 | A1 | 7/2007 | Huang et al. |
| 2007/0177800 | A1 | 8/2007 | Connell |
| 2007/0262857 | A1 | 11/2007 | Jackson |
| 2007/0263905 | A1 | 11/2007 | Chang et al. |
| 2007/0285511 | A1 | 12/2007 | Shafer et al. |
| 2008/0246600 | A1 | 10/2008 | Loges |
| 2008/0272902 | A1 | 11/2008 | Kang et al. |
| 2008/0284580 | A1 | 11/2008 | Babich et al. |
| 2009/0022362 | A1 | 1/2009 | Gagvani et al. |
| 2009/0141939 | A1* | 6/2009 | Chambers et al. ............ 382/103 |
| 2009/0249387 | A1* | 10/2009 | Magdy et al. ............ 725/32 |
| 2010/0290710 | A1 | 11/2010 | Gagvani et al. |
| 2011/0055882 | A1 | 3/2011 | Ohya |
| 2011/0090334 | A1 | 4/2011 | Hicks et al. |
| 2011/0234829 | A1 | 9/2011 | Gagvani |
| 2013/0121527 | A1 | 5/2013 | Chambers et al. |
| 2013/0314542 | A1 | 11/2013 | Jackson |

FOREIGN PATENT DOCUMENTS

| | | |
|---|---|---|
| WO | WO 2006/101477 | 9/2006 |
| WO | WO 2007/145623 | 12/2007 |

OTHER PUBLICATIONS

Office Action for U.S. Appl. No. 13/524,571, mailed Mar. 21, 2013.
Supplementary European Search Report and Opinion for European Application No. 08796198, mailed Jul. 24, 2013.
Office Action for U.S. Appl. No. 12/174,225, mailed Jan. 3, 2012.
Office Action for U.S. Appl. No. 12/174,225, mailed Jun. 8, 2012.
Office Action for U.S. Appl. No. 12/174,225, mailed Feb. 1, 2013.
Office Action for U.S. Appl. No. 12/174,225, mailed Nov. 15, 2013.
International Search Report and Written Opinion for International Application No. PCT/US2008/070134, mailed Oct. 7, 2008.
Office Action for U.S. Appl. No. 11/803,851, mailed Aug. 4, 2010.
Office Action for U.S. Appl. No. 13/083,635, mailed Dec. 8, 2011.
Office Action for U.S. Appl. No. 13/083,635, mailed Jun. 7, 2012.
Office Action for U.S. Appl. No. 13/716,777, mailed Oct. 8, 2013.
International Search Report and Written Opinion for International Application No. PCT/US2010/032013, mailed Jun. 28, 2010.
Office Action for U.S. Appl. No. 09/234,688, mailed Dec. 10, 1999.
Office Action for U.S. Appl. No. 09/234,688, mailed Apr. 12, 2000.
Website Information, MTeye Wireless Video Verification and Remote Viewing Solutions, May 4, 2007, http://mteye.co.il/home/index.aspx.
Website Information, Videofied, May 14, 2007, http://www.videofied.com/en/What_is_Videofied/.
Website Information, The iControl Solution, iControl Networks, May 14, 2007, http://www.icontrol.com/how/WorksMain.jsp.
Website Information, Swann Alert DVR Camera Kit, May 14, 2007, http://www.costco.com/Browse//Product.aspx?Prodid=11206961&whse=BC&topnav=&browse=.
Website Information, Q-See 16 CH MPEG4 DVR 250 GB HDD with Built-in DVD Burner, May 14, 2007, http://www.costco.com/Browse/Product.aspx?Prodid=11200471&whse=BC&topnav=&browse=.
Office Action for U.S. Appl. No. 14/452,847, mailed Mar. 13, 2015, 47 pages.
Office Action for U.S. Appl. No. 14/246,700, mailed Feb. 17, 2015.

(56) References Cited

OTHER PUBLICATIONS

Office Action for U.S. Appl. No. 14/533,916, mailed Mar. 26, 2015, 24 pages.

Office Action for U.S. Appl. No. 14/533,916, mailed Aug. 20, 2015, 25 pages.

* cited by examiner

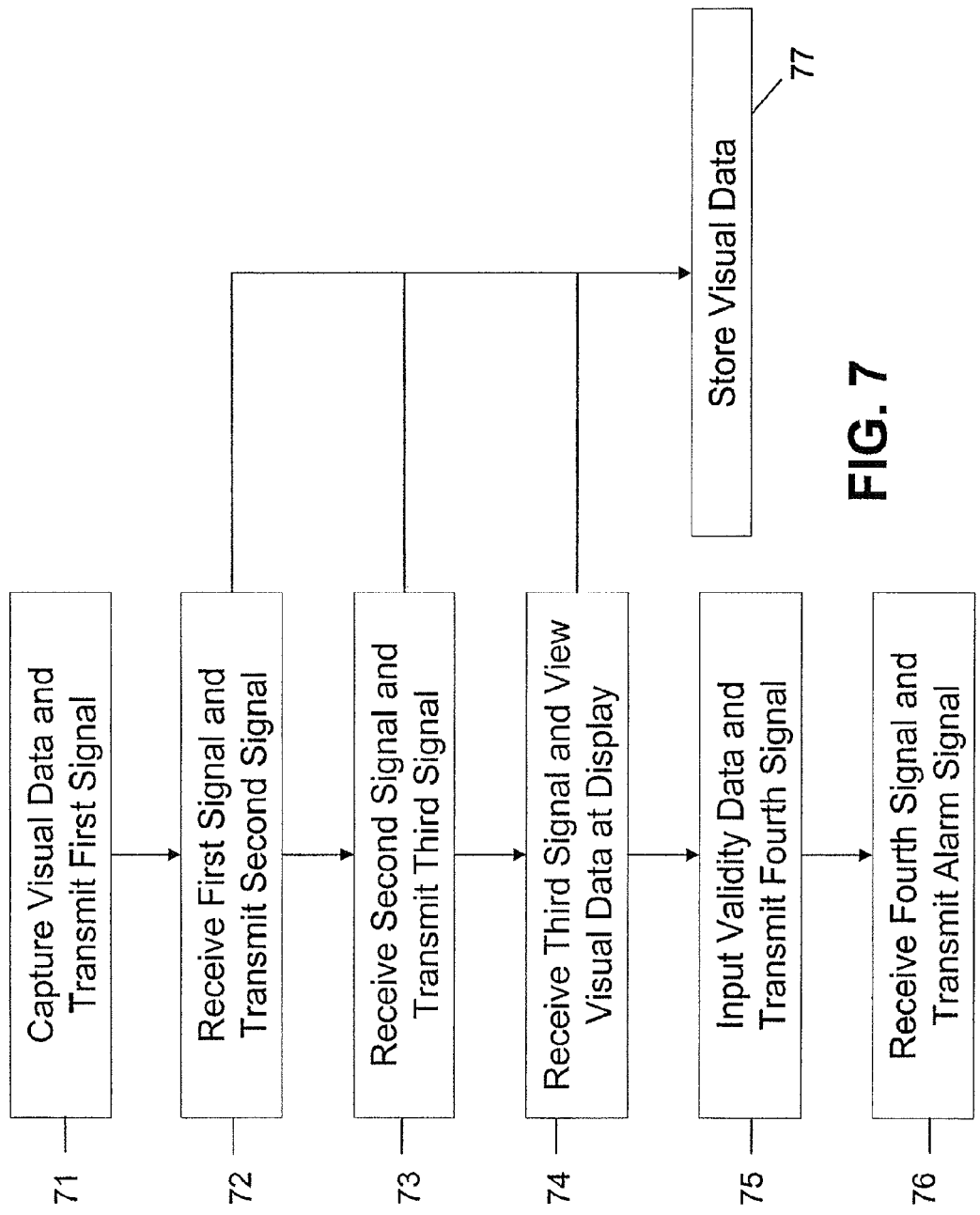

AUTOMATED, REMOTELY-VERIFIED ALARM SYSTEM WITH INTRUSION AND VIDEO SURVEILLANCE AND DIGITAL VIDEO RECORDING

RELATED APPLICATIONS

The present application is a continuation of U.S. application Ser. No. 14/246,700, entitled AUTOMATED, REMOTELY-VERIFIED ALARM SYSTEM WITH INTRUSION AND VIDEO SURVEILLANCE AND DIGITAL VIDEO RECORDING, filed Apr. 7, 2014,which is a continuation of U.S. application Ser. No. 13/716,777, entitled AUTOMATED, REMOTELY-VERIFIED ALARM SYSTEM WITH INTRUSION AND VIDEO SURVEILLANCE AND DIGITAL VIDEO RECORDING, filed Dec. 17, 2012, which is a continuation of U.S. application Ser. No. 13/083,635, entitled AUTOMATED, REMOTELY-VERIFIED ALARM SYSTEM WITH INTRUSION AND VIDEO SURVEILLANCE AND DIGITAL VIDEO RECORDING, filed Apr. 11, 2011 now U.S. Pat. No. 8,334,763, which is a continuation of U.S. application Ser. No. 11/803,851,entitled AUTOMATED, REMOTELY-VERIFIED ALARM SYSTEM WITH INTRUSION AND VIDEO SURVEILLANCE AND DIGITAL VIDEO RECORDING, filed May 15, 2007, now U.S. Pat. No. 7,956,735, which claims priority to U.S. Provisional Patent Application Ser. No. 60/800,505, entitled AUTOMATED SELF-MONITORED ALARM VERIFICATION SOLUTION, filed May 15, 2006, and U.S. Provisional Patent Application Ser. No. 60/800,504, entitled SELF-MONITORED INTRUSION AND VIDEO SURVEILLANCE WITH DIGITAL VIDEO RECORDING, filed May 15, 2006, the disclosures of which are incorporated herein by reference in their entireties.

FIELD OF THE INVENTION

The present invention relates generally to intrusion alarm systems, and more specifically it relates to an automated, remotely-monitored alarm verification solution for visually identifying the root cause of alarm events.

BACKGROUND OF THE INVENTION

It can be appreciated that intrusion alarm systems have been in use for years and are commonplace in commercial and residential applications. Typically, intrusion alarm systems are comprised of one or more passive sensors connected to a burglar alarm panel located at the monitored building or area. When the system is "armed" and any of the sensors is activated, a notification is sent to a central monitoring facility usually via a dial-up connection. Typically, an operator at the central station calls back the location and attempts to validate the alarm, usually via verbal exchange of a "secret" code or password. Failure to validate the alarm usually results in a call being placed to 3rd parties such as law enforcement officials.

These types of systems consist of one or more sensors connected to a control panel, which monitors the sensors, and delivers a status message to an alarm monitoring station when activated. In normal applications these types of sensors can only provide binary information indicating the active state of an alarm condition. In most instances, the alarm sensors are connected to an intrusion control panel, which monitors the sensors and determines the state of an alarm condition. The alarm activations are then sent to a manned alarm monitoring station usually via a public switched telephone network (PSTN) dial-up connection.

The main problem with conventional intrusion alarm systems is that they are very prone to false alarms due to inadequacies with existing technologies, and they provide no inexpensive means to visually validate an alarm remotely. False alarm statistics are persistently in the high 90% range, an extremely costly false-positive problem. Attempts have been made to try to address the false-alarm issue by deploying traditional closed circuit television (CCTV) cameras, however, these attempts have not met with success due to the cost of installation and equipment. Another problem with conventional intrusion alarm systems is that they are very expensive both for the initial equipment cost and monthly recurring charge to the end-user. Installation costs are typically passed on to the end-user. In addition, these systems typically use a dial-up connection to communicate alarm conditions back to a central monitoring station making validation a slow and tedious process. Another problem with conventional intrusion alarm systems is that they need to be actively monitored, generally requiring the use of a third-party monitoring service which can be prohibitively expensive and does substantially reduce the false positive problem.

BRIEF DESCRIPTION OF THE DRAWINGS

FIG. 7 depicts a block flow diagram of an alarm verification method according to an embodiment of the invention.

DETAILED DESCRIPTION OF THE PREFERRED EMBODIMENTS

Figure 1:
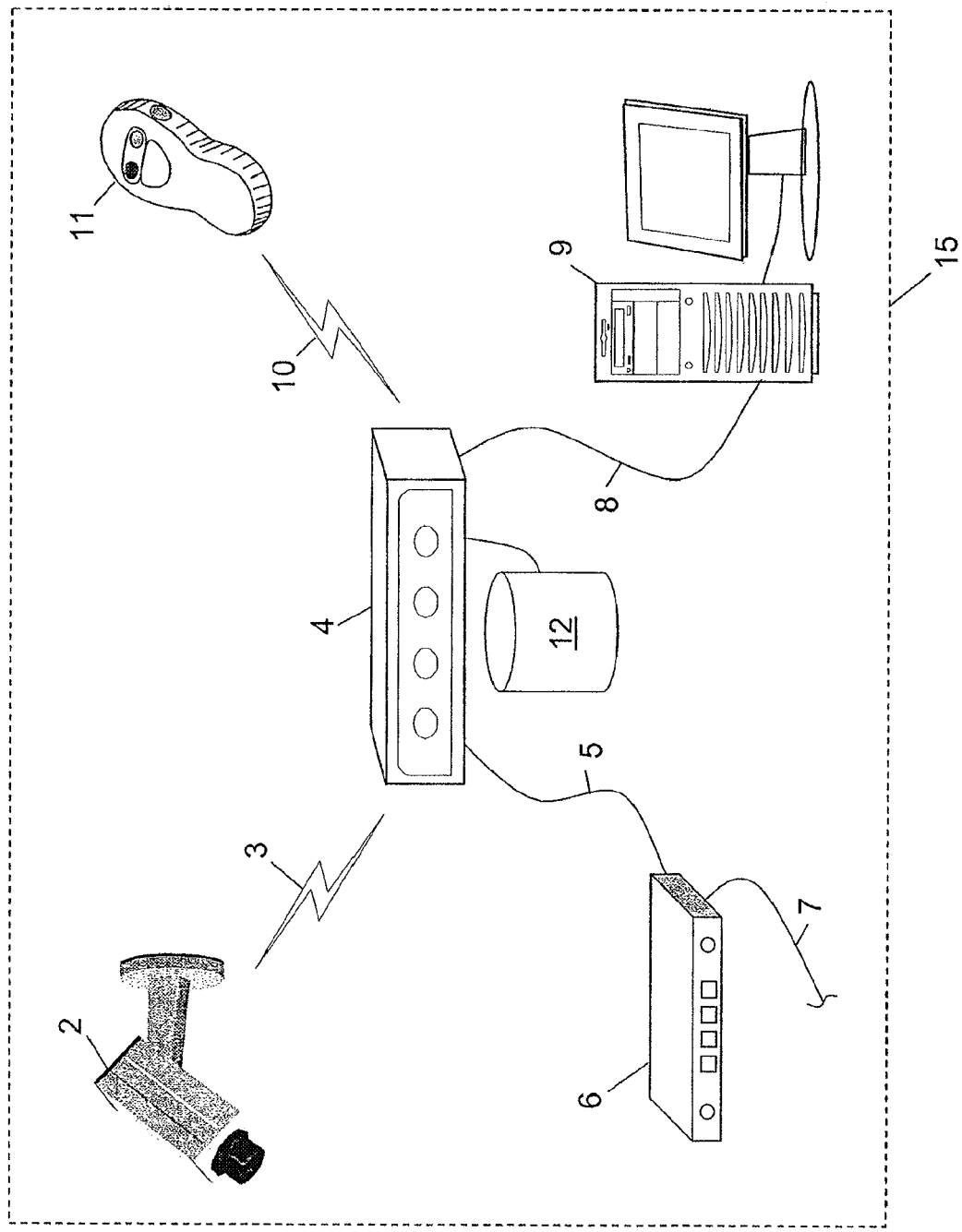
FIG. 1 depicts an iconic representation of a premises portion of an alarm system according to an embodiment of the invention.

The invention, in accordance with a typical embodiment, involves intrusion alarm systems which are verified remotely (e.g., by a user or another authorized entity, collectively "user" hereinafter for simplicity of description). The remotely-verified alarm solutions of the present invention substantially depart from the conventional concepts and designs of the prior art. In so doing, the invention provides embodiments of a system primarily developed for the purpose of visually identifying the root cause of alarm events directly and immediately, while utilizing modem high-speed Internet, phone networks, or private networks and web-enabled devices for remotely-monitoring. Furthermore, embodiments of the invention provide for contacting law enforcement agencies, other emergency response services, and/or any other third party designated by a user or other authorized entity, only if an alarm event is valid, and substantially or entirely without the intervention of a third party alarm monitoring company.

An end user can install a premise security system, and verify an alarm event regardless of the proximity of the end-user to the monitored location. When an alarm event takes place, the system delivers an alarm condition substantially autonomously to an end-user. The system uses wired and/or wireless Internet, phone networks, private networks, and/or other communication networks to deliver to the end user an image-based indication of the cause of an alarm.

Given the high incidence of false alarms due to less capable alarm systems, a highly desirable feature in embodiments of the invented alarm system is the ability to remotely and visually verify an alarm condition. False alarms can be caused in a variety of ways, including defective sensors and user error, such as failing to deactivate an alarm system upon entry. Common means for remotely verifying an actual alarm condition includes calling the premises and/or sending personnel to visit the premises from which the alarm signal originated. The invention seeks to alleviate the need for such inefficient, costly, and slow means of validation by providing the premise owner the ability to interrogate the cause of an alarm over any public network, Internet, phone network, or private network.

According to one embodiment of the present invention, an automated, remotely-verified alarm system includes: a) an integrated Passive InfraRed (PIR) sensor (or other motion sensor) for motion detection with an integrated camera (PIR-Cam) or separate sensor and camera, or motion sensing camera; b) a premise Security System Media Gateway (SSMG) with storage that manages a number of PIRs, cameras, or PIRCams and transmits alarm events and associated video or static images to a remote central server; c) a hosted remote web-server ("central server") that provides authentication, communication and data delivery to external remote end-users and law enforcement agencies; and d) remote end-user communication devices to receive telephone voice messages and/or data messages via email, instant messaging including text messaging, Systems Management Server (SMS) and/or Multimedia Messaging Service (MMS) messaging, and/or other network or web-enabled communication media. The embodiments of the invention, however, are not so limited.

Therefore, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the terms and phrases employed herein are for the purpose of simplicity and clarity in the description and should not be regarded as limiting.

Premises Portion of Alarm System

FIG. 1 depicts an embodiment of a portion of a remotely-verified alarm system configured to monitor a user's premises 15 (or "premises portion"). Included in the system, according to embodiments, are one or more image capture means such as cameras 2 for capturing images of portions of a monitored location. Most notably, locations such as building access points, windows, hallways, rooms containing high-value items, and other locations are typically beneficially monitored for intrusion detection or other exigencies and/or emergencies. Cameras 2 can be affixed to or at least partially within structural features of a building, such as a wall, ceiling, roof, structural support, ventilation passage, or other features. Alternatively, cameras can be provided in such landscape features as trees, shrubs, retaining walls, or other features. Wherever affixed, a camera 2 is configured so as to capture an image of an area where intrusion monitoring is desired. When numerous areas are to be monitored, cameras can be deployed in multiple locations as part of a distributed, interconnected monitoring network.

Cameras 2 in embodiments include stationary cameras, cameras capable of automatically sweeping from side to side to capture a larger area than a comparable stationary camera. Cameras can include those capable of multiple directional angles and/or directionally controllable either remotely or according to a pre-programmed scanning pattern. Cameras 2 can be configured to capture still images, full motion images (hereinafter, video), or a combination thereof, and such images will typically, but not exclusively, be either black-and-white or color images. Alternatively, cameras are used that are configured for extremely low light conditions (e.g., night vision) or for capturing viewable images of transient thermal differentials (e.g., thermal imaging) in the ambient environment.

Due to the highly variable placement of cameras 2, it may not always be convenient to extend wiring to a camera for wired transmission of signals to and from the camera. Therefore, while cameras are frequently connected by a wire, they may also transmit and receive signals wirelessly. Likewise, it may not be possible to maintain a continuous power supply to a camera 2 in various locations and/or situations. Therefore, an alternative and/or self-contained power supply can be provided in some situations. Examples of such include power provided by batteries, by a solar panel, by a generator, by an uninterruptible power supply (i.e., U.P.S.), by a redundant hardwired power supply, or by another device or method.

Cameras 2 used in a system according to embodiments may also possess other capabilities for enhancing the informational value from captured images. For example, cameras can include the ability to zoom in or out, such as to widen or narrow a field of view and increase the resolution of distant or small objects, or to compensate for changing light conditions.

In embodiments, a camera 2 includes a sensor capable of detecting changes in the ambient environmental conditions (hereinafter, alarm event and/or detection event), and the camera 2 is further configured to react to such changes by turning on or off, or by capturing a still image or video image (collectively, images). Alarm events can include a transient thermal (e.g., infrared, hereinafter IR) differential, a human-audible or inaudible sound, a transient reflection of a beam or signal wave emitted by the camera or another device, or other such changes. In embodiments, a sensor of a camera 2 can be calibrated relative to the background (e.g., normal) conditions of the environment where the camera 2 is affixed and is to operate. Further, a sensor of a camera 2, such as a passive IR sensor, can be configured to specifically detect and/or indicate the presence or occurrence of an alarm event only when such changes reach and/or exceed some threshold level (hereinafter, threshold).

While a sensor can be configured as a unitary part of a camera 2, in other embodiments, a sensor can be coupled with a camera 2 either by a wire or wirelessly, and be located relatively separately from the camera 2. For example, a sensor can include a magnetically coupled circuit affixed relative to a window or entryway such that the opening of a door or window breaks the circuit and causes the sensor to indicate a threshold alarm event to the camera 2. Likewise, a sensor can include a pressure and/or tensile sensitive device (e.g., pad, plate, strip), an optical beam emitter/detector system, any of the integral sensors described above, or any other capable of detecting a threshold alarm event. In general, one or more cameras 2 capable of detecting a threshold alarm event, whether having integral or separately coupled sensors, are collectively referred to hereinafter as "motion sensing cameras", or simply "cameras".

In still other embodiments, cameras 2 may simply be passive image gathering cameras not configured with threshold alarm event discrimination capability, but simply gather and transmit images to a signal processing device that has such capability. A signal processing device is described in more detail below.

Each embodiment of a camera 2 has the capability to convert a captured image into an electronic and/or optical signal and to transmit the signal out from the camera 2. In embodiments of a wireless camera, a wireless signal transmitter could transmit a signal including a converted image via IR transmission, laser, radio, BlueTooth technology, or some other relatively local and/or line of sight signal transmission technology. Alternatively, a camera transmitter can transmit an electronic signal via a conductive wire, or to convert an electronic signal to a suitable optical signal and transmit it via optical fiber. Therefore, a transmitter of a camera may be understood, according to alternate embodiments, to be one of a wired or wireless transmitter of electronic and/or optical signals including data corresponding to a captured image.

A transmitted signal from a camera deployed as described in a premises portion 15 of the system, is received in embodiments at a signal processing means 4 (hereinafter SSMG) configured to receive signals of the type transmitted by each of the cameras in the premises portion 15. A SSMG 4 can be thought of as a Security System Media Gateway; and it serves as a central collection and transmission device for security systems described in embodiments of the invention. Further, an SSMG 4 acts as a gateway for command signals sent to cameras 2 by one or more control devices in a system embodiment, either automatically or as directed by a user. The SSMG 4 typically is configured to and capable of monitoring, exchanging signals with, and/or controlling numerous cameras 2.

An example of a device that can be used as a SSMG 4 is a Media Gateway device available from MTeye Security Ltd, although the embodiments are not so limited, and others can be used according to alternative embodiments. The SSMG can be configured to receive power from a primary power source, for example an external 12V DC adaptor, but may also include a secondary (e.g., backup) power source, such as one of those described above relative to cameras 2. The SSMG can be configured with status indicators for power, wireless connectivity, and alerts, although more or fewer than these may also be included.

In an embodiment, the SSMG 4 continuously polls each camera 2 for an alarm condition over a secure wireless link, which is indicated by a change in state in, for example, a sensor device. Upon detection, the SSMG downloads an image from the camera and stores it locally. A signal relay device may be used in situations where a camera 2 is placed too far from the signal processing device 4 for consistent or effective signal transfer. For example, a camera 2 can transmit a wireless signal 3 to an intermediately located relay device, which then transmits the signal by wire to the signal processing device 4. Furthermore, an embodiment can include the camera 2 and the SSMG 4 integrated as a relatively unitary device, wherein signal transmission between the camera 2 and the SSMG 4 occurs internally within the integrated device. One having ordinary skill in the art will recognize numerous other alternatives, so they are not exhaustively described herein.

The SSMG 4 can alternatively be configured with a data storage means 12 enabling local storage of captured images. Storage means 12 can be an integrated or peripheral hard disc drive, a memory chip or chip device (e.g., dual in-line memory module, DIMM or integrated memory within a micro processor), fixed or removable memory of any known format (e.g., RAM, flash, compact flash), an optical storage media device (e.g., DVD, CD), or some other mass storage device or combination of devices as known to those having skill in the art as the embodiments are not so limited. Further, inasmuch as storage media and device technologies continue to develop and change in form, capabilities, and perhaps most notably in capacity relative to size, embodiments of the invention are not limited to only those storage media and/or devices now in use, Rather, the disclosure of storage means 12 herein is intended to encompass any storage devices or media capable of storing data corresponding to images (e.g., memory chip, optically and/or magnetically encoded data, or other memory device). In a particularly useful embodiment, the SSMG 4 is configured to include the functions and capabilities of a digital video recorder (DVR), either integrally within the SSMG 4 or as a peripheral component controllably coupled with the SSMG 4.

The SSMG 4 will typically, but not always, be coupled with other components within the premises 15. For example, a signal transmitting means 6 (e.g., router, modem, cable converter box, computer) can be coupled in communication with the SSMG 4, either by a wire 5, or wirelessly. The signal transmitting means 6, for example, will further include a continuous and/or non-continuous connection, by wire 7 and/or wirelessly, to elements of the system external to the premises 15. In other embodiments, the functions of a signal transmitting means 6 can be integrated into the SSMG 4, thus eliminating the need for a peripheral signal transmitting means 6. Signal transmitting means 6, whether configured integrally with the SSMG 4 or separately, is configured to transmit a signal including data corresponding to one or more images, by at least one of the numerous transmission means and/or technologies currently available. Such transmission means and/or technologies can include any one or more of cable broadband, DSL, WAN, WiMAX, Wi-Fi, cellular phone signal, satellite, and/or others as known in the art.

The SSMG 4 can be further coupled with a data input and/or computing means 9, such as a computer (hereinafter "local computer")(e.g., desktop computer, portable computer) or similar device. Such local computer 9 is configured, according to alternative embodiments, to perform one or more of receiving, processing, storing, and/or conveying to the SSMG 4 at least a first set of configuration parameters. Configuration parameters can include any one or more of camera control parameters (e.g. image capture settings, camera identification data), sensor control parameters (e.g., event trigger thresholds settings), data storage parameters (e.g., compression, format, location), DVR functional parameters, security parameters (e.g., access codes, user passwords), and automated and/or remote system activation/deactivation parameters, although this is not intended to be an exclusive list, and other system configuration parameters are also anticipated according to embodiments. The local computer 9 can also be preconfigured with configuration parameters including contact information and/or communication method selection for connecting with a central server upon the occurrence of an alarm event, with a remote end-user device, and contact information for emergency response services and/or agencies.

The local computer 9 can be configured to be a DVR device, rather than the SSMG 4 in an embodiment, including capacity and means for storage, retrieval, and/or viewing of images. With regard to either the SSMG 4 or the local computer 9, DVR capabilities can be configured at least in part as software instructions fixed in a tangible medium, such as a hard disc drive medium or an optical storage medium.

The local computer 9 is coupled in communication with the SSMG 4 by a wire 8 according to an embodiment, but could alternatively be coupled wirelessly. For purposes of clarification, a "wire" as referred to throughout this description includes any tangible signal conveying means embodied as hardware (i.e., not air), such as an optical fiber or bundle, or an electrically conductive wire or cable, and is not limited to any one particular form. The local computer 9 typically includes a storage means for storing at least one or more configuration parameters, captured images, or other data related to system functions. A local computer 9 typically also includes a peripheral input device (e.g., mouse, keyboard), a display device (e.g., monitor), and/or an output device (e.g., printer), although one or more of these may be omitted in some configurations. Further, embodiments of a local computer 9 can also include an integrated signal transmitting means 6, obviating the need for a stand-alone signal transmitting means 6 or a signal transmitting means 6 integrated with the SSMG 4.

While the local computer 9 typically exists separately from the SSMG, a particularly integrated embodiment of the SSMG 4 can incorporate one or more of the features, devices, or functions of the local computer 9, or can even obviate the need for a separate local computer 9. Conversely, the functions and/or structural features of an SSMG 4 can be integrated into a local computer 9. Alternatively, the local computer can instead be a remote computer located remotely from the premises, yet performing all or substantially all of the functions as described herein, such as by communicating with the SSMG 4 over a public or private network.

While most of the elements of a premises portion 15 typically remain relatively stationary, a system can include a portable, wireless signal transmitting means 11 configured to transmit a wireless signal 10 for remotely altering the activation status of the system. For example, a portable, wireless signal transmitter 11 can be configured as a key chain device (e.g., key fob) or other remote control device. Alternatively, a portable, wireless signal transmitter 11 can be integrated into another electronic device. Generally the portable, wireless signal transmitter 11 will be configured for relatively short range transmission, but is not necessarily so limited, and can provide for control even at extended distances. Further, the portable, wireless signal transmitter 11 will generally include an integral power supply, such as a replaceable or rechargeable battery, to enable portability. The portable, wireless signal transmitter 11 can be used to activate and/or deactivate the alarm system, and/or lock or unlock a door, and may include functions for otherwise altering at least a first set of configuration parameters of an embodiment of a remotely-verified alarm system. In such embodiments, a wireless transceiver will be included in the SSMG 4 to receive and/or exchange signals with the portable, wireless signal transmitter 11, enabling the SSMG 4 to affect changes to the alarm system in response to the signals.

Elements of the premises portion 15 will generally be powered by an existing electrical power system present at the monitored location (e.g., a residence, business office). However, the electrical power system can be intentionally and/or accidentally interrupted. Therefore, embodiments of the premises portion of a self-monitored alarm system include a back-up power source to provide substantially continuous alarm system operation despite the interruption of a primary electrical system. A back-up system can include at least one of a solar energy power source, a power generator (e.g., gasoline powered), a commercial uninterruptible power supply (UPS), a battery system, or other power source.

Server Portion of Alarm System

Figure 2:
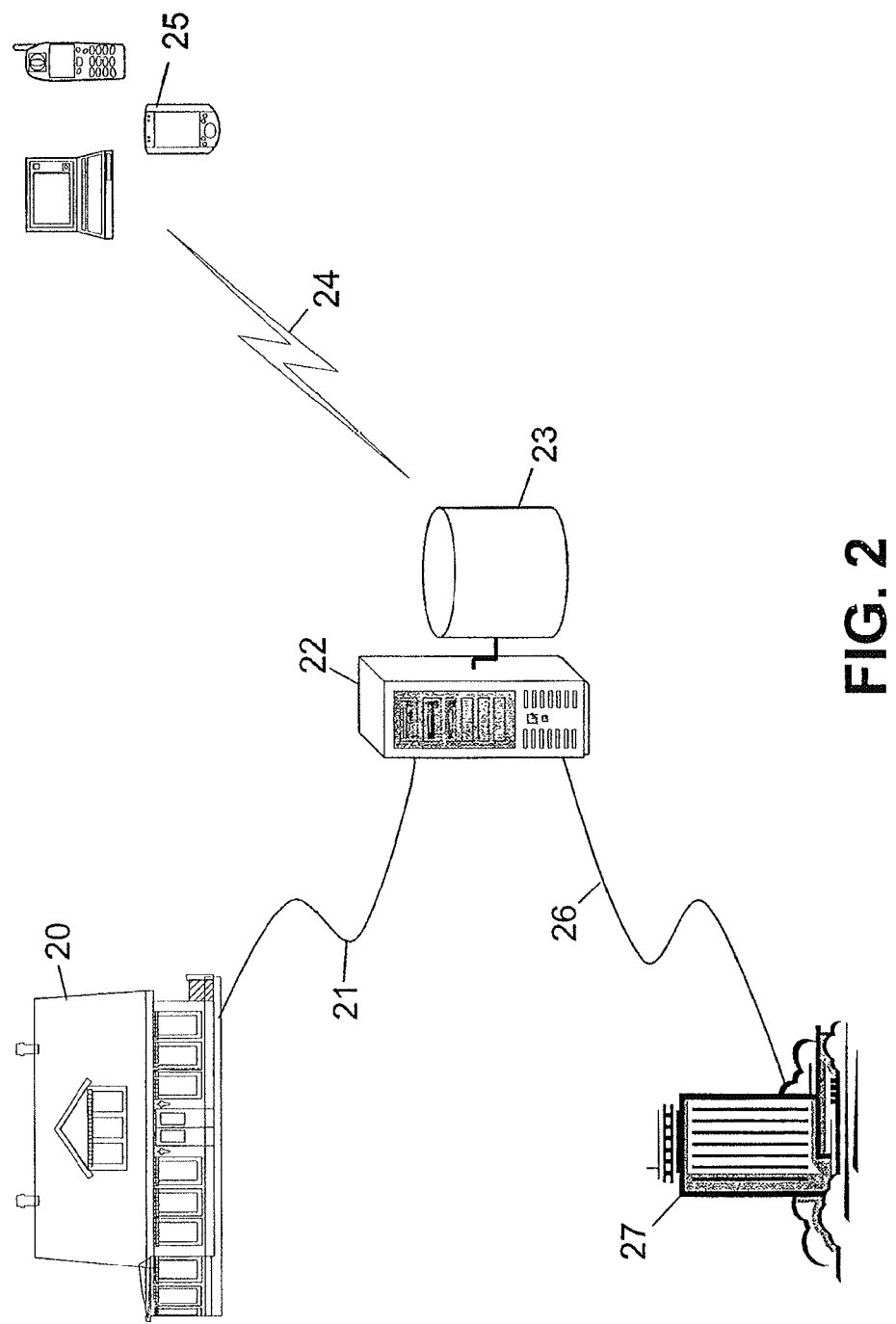
FIG. 2 depicts an iconic representation of an extended portion of an alarm system according to an embodiment of the invention.

The premises portion 15 comprises only a portion of embodiments of the invention. As shown in FIG. 2, the monitored premises 20 (and the premises portion 15) is coupled in communication with a central server 22 (server). The central server 22 typically includes both hardware and software components, and is hosted at an off-site location relative to the user's monitored premises 20. It provides, among other functions, premise and end-user authentication and/or authorization, storage of preconfigured settings, and communication capabilities including but not limited to email, IP, SMS messaging, MMS messaging, and telephone text-to-speech communication, to communicate with both the remote end-user device 25 and emergency response services 27. The central server 22 also archives alarm events and associated video or images and makes those available for remote end-user viewing from, for example, a standard web-browser utility.

As discussed above relative to the signal transmitting means 6, premises 20 is coupled with the server 22 by a signal conveying means 21 (e.g., optical, electrically conductive) in some embodiments, while in others, the communicative coupling is partially or entirely wireless. The signal conveying means 21 is generally part of a public network, Internet, phone network, or private network, but is not so limited.

The central server 22 (or "server") can be a hosted web-server, and will generally be monitored, either locally or remotely, by a human attendant. However, it can also perform many if not all of its alarm system functions according to pre-configured parameters, settings and/or programs without substantial human intervention.

A server 22 is also coupled with a data storage means 23 in embodiments. The data storage means 23 enables storage and retrieval of data corresponding to images transmitted from the premise 20 to the server 22. It can also retain predetermined configuration parameters and/or instructions relating to individual end users, premises 20, emergency response services 27, and/or other detection and alarm activation relevant data. Therefore, storage of image data is not necessarily required at the premises portion 15 in all embodiments, simplifying the components and functions present at the premises portion 15 of the alarm system.

Figure 3:
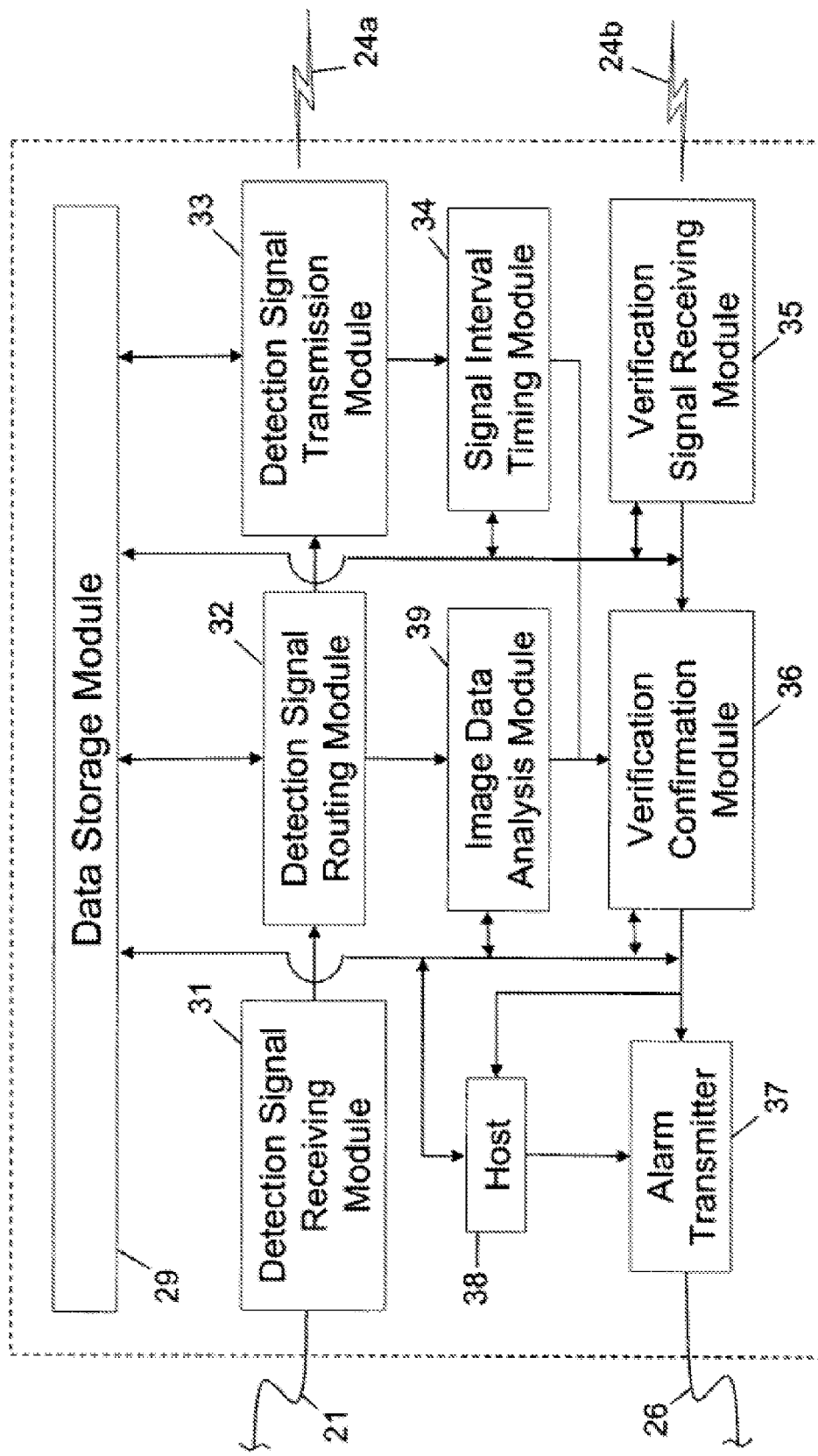
FIG. 3 depicts a block diagram of a server portion of an alarm system according to an embodiment of the invention.

While in embodiments, server 22 comprises a relatively unitary network service device, as depicted in FIG. 2, server 22 is broadly contemplated as an collection of functional modules, structurally embodied, and collectively considered a "server portion". Referring to FIG. 3, the server portion 30 is represented as a block diagram including numerous structural and/or functional modules, one or more of which is coupled with a data storage module 29 and with at least another module. Signal conveying means 21 from the premises is coupled with a Detection. Signal Receiving Module 31 (DSR module) of the server portion 30. The DSR module 31 can include structural elements, for example an antenna or a cable connection structure. The DSR module 31 can also include discriminating elements (e.g. signal analytics) embodied in software and/or firmware which identify at least one of the source, nature, and status of a received signal based, for example, on the signal strength and/or based on other data associated with the signal. The DSR module 31 can subsequently alter the signal by adding data to the signal and can convey the signal to a Detection Signal Routing Module 32 (routing module), or can convey the signal to the routing module substantially unchanged.

The routing module 32 receives the signal, and evaluates characteristics of the signal as defined by data included in the signal. For example, the signal can include data identifying a unique user, and/or image data that can be compared to baseline image data stored in data storage module 29 to identify anomalies relative to the baseline image data. The routing module 32 can then utilize the identification and/or other data to retrieve unique transmission parameters from data storage module 29, the transmission parameters providing instructions and/or information needed for transmitting a signal to the appropriate end user including at least the image data. Alternatively, the necessary transmission parameters can be included in the signal as transmitted from the premises 20 and received at the DSR module 31.

The routing module 32 subsequently conveys the transmission parameters and the received images to a Detection Signal Transmission Module 33 (transmission module). The transmission module 33 reads and recognizes the transmission parameters and transmits a signal 24a including the images to an end user device 25 depicted in FIG. 2.

Alternatively and/or independently, if optionally enabled by the user, transmission of the signal 24a to the end user device 25 is recognized by a Signal Interval Timing Module 34 (timing module), and identified as to both the user and the specific signal 24a. This is possible, in embodiments, due to the signal 24a including associated data uniquely identifying the user and the transmitted signal, such as by date—and/or time-related data, or a unique code generated specifically for each signal transmission. In response to the transmission, the timing module 34 begins monitoring the duration of time between the transmission of the signal 24a from the transmission module 33 to the user, and the return of an alarm verification signal 24b from the user device 25. The timing module 34 can be implemented at least in part as software, and can include either integral time-keeping components, or can track time according to a timing system maintained by a third party (e.g., The National Institute of Standards and Technology).

The transmitted signal 24a can take the form of any of a plurality of available communication methods, including but not limited to network messages, email, SMS messaging, MMS messaging, text-to-speech communication or another as known or may be provided in the art. Further, the signal can be transmitted by or as any one of GSM cell phone signal, GPRS, WiMax network or another communication format or infrastructure, as are known or may be provided in the art.

When the user device transmits a verification signal 24b, and provided the user device is within reception range, the verification signal is received at a Verification Signal Receiving Module 35 (VSR module) of the server portion 30. The verification signal 24b, which typically will not include image data, but will include data corresponding to at least a portion of the unique identifying data associated with signal 24a, is then conveyed from the VSR module 35 to a Verification Confirmation Module 36 (VC module). The VC module recognizes the unique identifying data, and instructs the timing module 34 to cease monitoring the elapsed time since transmission of signal 24a.

The VC module then identifies data associated with the verification signal 24b to determine a user specified alarm status. If the user specified a status verifying that the alarm is valid, then the VC module 36 will notify a Host 38 of the server portion 30 to report an alarm to a public and/or private Emergency Response Service 27 (see FIG. 2) via an Alarm Transmitter 37. However, if the user specified a status verifying that the alarm is invalid (e.g., a false alarm), then the VC module will notify the host 38 of the server portion that the alarm is invalid, and therefore does not warrant contacting the emergency response service 27. It is contemplated that in embodiments, rather than contacting an established Emergency Response Service or agency, some other third party (e.g. a neighbor, a friend, and employee) is contacted by the Alarm Transmitter 37. However, for simplicity of description and without intending any narrowing by the term, the various embodiments are broadly referred to herein as an Emergency Response Service 27.

The alarm transmitter 27 can be a telephone, a radio system, a network message connection, an internet connection, or nearly any other device or system permissible and capable within a particular area for contacting emergency response organizations. Generally, local and/or state laws may require that any call to public emergency response services via the 9-1-1 system must be made by a human, and not automated to operate without human intervention. Therefore, the host 38 is typically human. However, embodiments of the invention are not so limited, and could provide for an automated alarm transmission to, for example a privately contracted security company or a neighbor near the monitored premise 20. Therefore in embodiments, the host 38 can be a decision-making module capable of evaluating input data and executing an action based upon predetermined contact parameters and/or instructions, or the VC module 36 can itself cause the alarm transmitter 37 to transmit an to the emergency response service 27. In situations not directly involving a human host, the host 38 may be embodied at least partially as software capable of evaluating data input from a verification signal 24b, determining an appropriate response according to predetermined instructions, and as output, affecting the appropriate response, such as causing an alarm transmitter 37 to transmit a valid alarm.

In general, an alarm transmitted from the server portion 30 to a emergency response service 27 is transmitted according to a set of predetermined contact parameters (e.g., radio frequency, telephone number, email address) and/or other instructions. Such parameters and/or instructions provide that the relevant and/or necessary information is conveyed to the appropriate services 27 (e.g., closest to the monitored premise 20, appropriate to the type of alarm event) and/or consolidated dispatch center to respond to the alarm event, and may also include additional content and value.

According to an embodiment, the server portion 30 may not receive a verification signal from the user for an extended period of time. For example, the user may be out of signal transmission range, or the user's device may be malfunctioning, deactivated, or left behind by the user. In such situations, the timing module 34 can, as part of the configuration parameters associated with a user, determine the expiration of an allotted duration of time without receipt of a verification signal 24b. Upon such expiration, the timing module 34 notifies the VC module 30 of the expiration, and conveys to the VC module 30 data associated with the unacknowledged signal 24a (including the user identification data).

The VC module 30 then retrieves instructions and/or other configuration parameters from the data storage module 29. Typically, the VC module 30 notifies the host 38 which then contacts the premises via a transmission means. For example, the VC module 30 will, in an embodiment, cause a telephone call to be placed to the premises 20. If the telephone call is not answered by the premises 20, or alternatively, if the call is answered but the answering party fails to correctly provide and/or authenticate a pre-configured password or some other security code, the VC module 30 of the server portion 30 will notify the host 38 that conditions exist for transmitting an alarm signal to an emergency response service 27 via the alarm transmitter 37. Alternatively, a user can provide predetermined instructions directing the server portion 30 to transmit an alarm signal to an emergency response service 27 without first attempting to contact the premises 20.

According to an alternative embodiment, the server portion 30 includes an Image Data Analysis Module 39 (analysis module). A server portion 30 including this module allows a user to specify conditions for transmitting a valid alarm based upon characteristics of a captured image. For example, an alarm event detection signal is received at the DSR 31 and is conveyed to the routing module 32. The routing module 32 recognizes configuration data associated with the signal, checks the data storage module 29 for instructions relating to user and/or premises identifying data associated with the signal, and in accordance with predetermined instructions, conveys the signal to the analysis module 39 rather than (or in addition to) the transmission module 33.

The analysis module 39 includes, in embodiments, video analytics means (e.g., image analysis software) configured to analyze data in the signal corresponding to captured image data (e.g., static images, video). Further, the analysis module 39 is configured to discriminate based at least in part on the content of image data and predetermined configuration parameters. If the video analytics means identify image data representing a human presence and/or other behavior, and if so indicated according to predetermined alarm parameters, the analysis module 39 conveys a signal to the VC module 36 confirming a valid alarm. Therefore, the VC module 36 will notify the host 38, and a valid alarm signal is transmitted to an emergency response service 27.

Alternatively, if no images corresponding to predetermined alarm triggers are identified in the image data of the signal, the analysis module 39 can either convey a signal to the VC module 36 confirming an invalid alarm, or can return the signal to the routing module 32 with associated data indicating an inconclusive video analysis. In the latter situation, if instructions in the data storage module 29 so indicate, the VC module 32 will then convey the signal to the transmission module 33 for transmission to the user for verification.

Therefore, in an embodiment including an image data analysis module 39, an additional level of automation and image-based alarm verification is provided to help reduce the number of false alarms, while still providing the option for subjective user review. Such embodiments constitute an intelligent burglar alarm system embodiment of a remotely-verified alarm system.

It is noted that several of the modules included in the server portion 30 are configured for processing data associated with a signal and/or accessing and acting upon predetermined instructions. Although the description above indicates that instructions are generally stored in and accessed at a data storage module 29 (a central data storage means in embodiments), other embodiments include dedicated data storage means associated with one or more of the modules of the server portion 30. Such dedicated data storage means will typically, but not exclusively, constitute a sub-portion of a particular module, and may store instructions particular to the operations of that module. Likewise, a dedicated storage means can be shared by two or more modules, although being an integral part of one module, or even existing as a separate storage module in addition of storage module 29. In embodiments, storage module 29 can be designated for image data storage only, while one or more other data storage modules of the server portion 30 are designated for retaining instructions and other information. Therefore, a server portion 30 can include more than one storage means and/or more than one storage module, and each of a plurality of data storage means and/or modules can be designated to fulfill either redundant and/or different purposes relative to at least another data storage means and/or module.

Each module in the server portion generally includes structural elements, such as electronic components, configured and coupled with and/or relative to each other so as to meet the functional purpose(s) of the module. Further, each module is configured and coupled with and/or relative to at least another module of the server portion so as to meet the functional purposes of the server portion 30. While a server portion 30 can be embodied as a single device, such as a web server, the embodiments are not so limited. For example, a storage module 29 can comprise a device separate from but communicatively coupled with one or more other devices, with the plurality of devices comprising the server portion 30. Likewise, as mentioned, the server portion need not be comprised entirely as devices, but can include a human element as, for example a host 38.

The operations of the server portion modules, however, generally operate at least in part based upon pre-determined instructions provided by a user. Instructions are predetermined, throughout this description, inasmuch as they are provided at least in part by the user at a time prior to the operation of the module upon a particular signal. In embodiments, a signal arriving at a module from another module, a premises, or a user device, for example, may include associated instructions. Here too, although the instructions arrive at the module at the same time as a signal, they were provided by the user at or prior to the time the signal was transmitted to the module and so are predetermined instructions.

One or more of the modules of the server portion 30 also process signals, which can include any action taken upon or in response to a signal beyond simply conveying the signal through the module unchanged. Therefore, at least one module of a server portion 30, according to embodiments, also includes logic capability, and/or comprises a software component. Indeed, a module may be entirely or substantially configured as software embodied in a tangible medium and configured to be executed by a computing device. As a result of such execution, the software can cause, for example, a transmitting module 33 or alarm module 37 to transmit a signal.

Although numerous modules are described herein as comprising a server portion 30 of an alarm system, it is also anticipated that any two or more modules can be embodied as a single integrated module configured to perform the described functions of the integrated modules. Further, the server portion can be embodied as several physically distinct but functionally and communicatively coupled devices. Therefore, the term "server" used herein can refer to a single computing device embodying part or all of the server portion, or can refer to the server portion 30 generally.

End-User Device Portion of Alarm System

Turning again to FIG. 2, and as noted above, the server 22 is typically but not exclusively coupled in communication with an end-user (user) device 25. The conveying means 24 will generally, but not exclusively, include wired and/or wireless communication network infrastructure including public and/or private receivers, transmitters, signal boosters, relays, and/or other wired and/or wireless signal conveyance infrastructure (e.g., hardware, facilities, devices). Indeed, such infrastructure can comprise all or part of any of the wired and/or wireless signal pathways set forth in this description.

A user device can include, but certainly is not limited to, any portable electronic device such as a mobile telephone, a web-enabled personal digital assistant (PDA), a relatively stationary and/or mobile computer (e.g., desktop, notebook, tablet, palmtop), or an electronic communications device integrated within an automobile. In general, a user device is any electronic device(s) capable, either individually or when combined, of receiving a signal including data corresponding to at least one image, displaying the image to the user, and transmitting a signal including a remotely-verified response to an alarm event.

As with the server 22 and server portion 30, while the end user device 25 typically (but not exclusively) comprises a unitary device, it may be more clearly understood as a collection of structurally-embodied functional modules, collectively referred to as an "end-user device portion".

Figure 4:
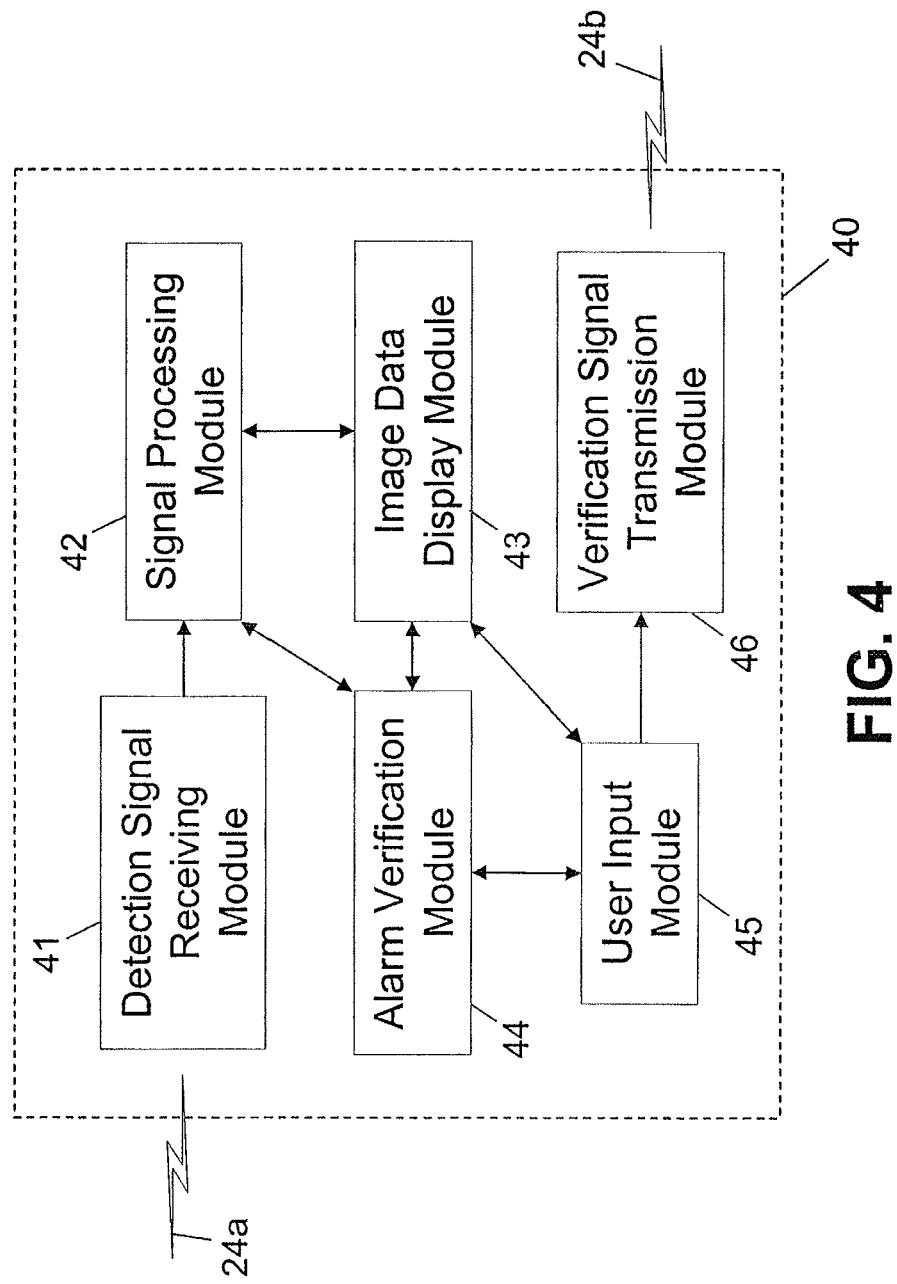
FIG. 4 depicts a block diagram of an end-user device portion of an alarm system according to an embodiment of the invention.

FIG. 4 depicts an embodiment of a user device portion 40 of an alarm system including numerous structural and functional modules, although more or fewer modules may exist in alternate embodiments having greater or lesser levels of integration. An alarm detection signal 24*a* transmitted from the server portion 30 is received at a Detection Signal Receiving Module 41 (DSR). The DSR 41 is typically, but not exclusively, embodied as a wired or wireless network connection, of which many forms are known in the art and can be used according to embodiments. For example, the DSR 41 can be internal or external to the device, can be fixed or extensible (e.g., a telescoping antenna structure), and can be configured for efficiently receiving one or more of various signal formats that may be transmitted from the server portion 30. A DSR 41 can also include electronic, optical, and/or optoelectronic components configured for receiving, amplifying, converting, transforming, or otherwise acquiring a transmitted signal. Therefore, the embodiments of a wired or wireless network connection as conceived herein are expansive rather than limited.

Once received at the DSR 41, the signal 24*a* is conveyed to a Signal Processing Module 42, where the signal or some part thereof is read, modified, interpreted, separated, or otherwise operated upon. The processing module 42 typically includes a processing means, such as a microprocessor device, a graphics generator, and/or another integrated circuit device. Further, a processing module 42 can include or be coupled in communication with a data storage means, such as a hard disc drive, a memory chip or chip device (e.g., dual in-line memory module, or DIMM), or a removable memory card of any known format (e.g., compact flash), although the embodiments are not so limited. In embodiments, the memory means includes instructions which, when operated upon by the processing module 42, recognize data in the signal and cause the device to notify the user of the alarm.

Notification can include the device emitting an audible signal that the user can perceive, or can include a substantially silent signal, such as displaying a message indicating receipt of an alarm, or causing a vibration generating device within the user device 40 to generate a user-perceptible vibration. In those devices including multiple possible notification modes, the user is able to select from the available modes.

The processing module 42 also identifies image data in a received signal 24*a*, and stores the data in the user device portion 40 for later access and viewing by the user. For example, the image data can be included in a file attached to an email message, or accessible via an included link, or otherwise associated with the signal. Alternatively, the processing module 42 will convey the image data, whether altered or unaltered, to an Image Data Display Module 43 (display) capable of converting the image data into an image that is viewable by the user.

According to an alternative embodiment, the signal 24*a* can include a link or other information enabling and/or directing the end user to access a hosted website to obtain image data and alarm condition information. Likewise, the user device may include a data storage means containing predetermined contact information for contacting a hosted website or another image data-storage and transmission service and/or device. When accessing the hosted website, the user can view stored images at or accessible through the website. Alternatively, the user can access the SSMG 4 via the website and view real-time images from one or more of the cameras 2 monitoring the premises 20. The hosted website described herein will typically, but not exclusively, be located at the server portion 30.

The display 43 can include processing means to convert and otherwise modify image data into a viewable form independently from the processing module 42, or can simply receive and display image data as a viewable image without otherwise transforming the data. The display 43 can also share processing means with the processing module 42, the DSR 41, or both.

A display 43 generally also comprises any of a number of image display means. For example, a display 43 can include an LCD display, a plasma display, or a CRT display. In general, a display 43 is virtually any image display technology currently known or reasonably contemplated that can be integrated into a portable user device 40, or with which a portable user device 40 can be operatively coupled. In the latter situation, a display 43 of a user device 40 need not be permanently coupled with the user device 40, but can exist separately and be considered a part of the user device 40 when coupled thereto.

A user device 40 further includes an Alarm Verification Module 44. The verification module 44 provides a means for a user to control how an image is displayed, whether the image is a static image, a full-motion video image, or some other form. Control parameters can include start, stop, advance, reverse, zoom, contrast, color, tone, or other such useful playback and/or image modification capabilities as would be understood by those having skill in the art. Further, the verification module 44 provides a means for the user to indicate the status and/or disposition of an alarm signal. For example, if the user determines that the image depicts conditions requiring an emergency response (e.g., unauthorized intrusion, fire, medical emergency), the user can indicate that the alarm is valid, and select an appropriate response method via the verification module 44. Conversely, if the image depicts conditions requiring no response, the user can indicate that the alarm signal is invalid, and that no response or a lesser response is appropriate.

The verification module 44 includes, in embodiments, processing means, which can be dedicated or can be shared with one or more of the other modules. The verification module 44 can also be coupled with data storage means and can access and operate upon data and/or instructions stored therein. Therefore, the verification module 44 can present a graphic user interface (GUI) at the display 43, visually providing a clear and user-friendly interface for selecting an alarm status, for controlling the display of an image, or for selecting and/or altering any other configuration parameter.

For example, a user can, by interacting with a GUI, respond to an alarm notification by causing an image to appear on the display 43. Upon viewing the image, the user can, again using the GUI, select to respond to the alarm, whereupon the GUI changes to present a set of options to the user. The user can then select an option (e.g., "Alarm Valid"), causing another GUI to appear and provide options for an appropriate response (e.g., "Contact 9-1-1"). Lastly, another GUI can appear, and the user can select an option causing the device to transmit a signal 24*b* including the user-selected alarm verification status to the server portion 30. While the embodiment described above includes various user-input methods implemented as GUIs, the embodiments are not so limited, nor are the format or content of the described GUIs. A GUI-implemented alarm validation interface can be as simple as one or more icons presented at the display of the device that the user selects to indicate an alarm validation status.

In an alternate embodiment, the user device 40 includes a user input module 45 such as a key pad, a touch screen, a touch-sensitive pad, or another input modes and/or device as known to those skilled in the art. Therefore, the input module 45 can include a physical input device, or can alternatively include a GUI as described above with regard to the verification module 44. The input module 45 and the verification module 44 can also functionally interact. For example, when a user inputs a response using a key pad in response to a message presented via a GUI, the user's response causes the GUI to change and present a new set of options to the user, the new options based at least in part on which option the user selected.

User input module 45 can be a part of another device, (e.g. a cell phone, a PDA, a computer). The user input module 45, in embodiments, also includes processing means as described relative to other of the modules, and/or is coupled in communication with data storage means to access and operate upon, or in response to, stored instructions.

Upon user selection of an alarm verification status, a Verification Signal Transmission Module 46 (VST) of the user device 40 transmits a signal 24*b* to the server portion 30 including at least data indicating the user selected verification status. The VST 46 includes a signal transmitter, which can transmit via one of a wireless or a wire-conveyed signal. Further, the transmission module 46 includes, in embodiments, processing means as described relative to other embodiments, and/or is coupled in communication with data storage means, for accessing stored signal relevant data and/or for acting upon or according to stored instructions. For example, acting according to transmission parameter instructions can cause the transmission module 46 to convert an electronic digital signal into an optical signal for transmission via an optical signal conveying means (e.g. optical fiber).

The transmission means, technology, and/or message format (collectively "format") of the transmitted verification signal 24*b* can be the same as that of the detection signal 24*a*, or it can be different according to alternative embodiments. For example, a signal format can include messages sent via email, IP, web-link, SMS messaging, MMS messaging, or voice activated or touch-tone dialing. Therefore, the VST 46 is configured to transmit a signal according to a particular transmission format as described above, or can be configured to transmit via more than one format. Generally, the VST 46 transmits in a format which can be received and properly (e.g., correctly, effectively) interpreted at the server portion. The transmitted verification signal 24*b* will generally also include data identifying the user and/or will include all or some portion of a unique signal identifying code transmitted from the server portion 30 to the user device 40. In embodiments, the user may be required to enter a password or other unique identification code when responding to an alarm. In such embodiments, the password or other code is included in the transmitted verification signal 24*b* to notify the server portion 30 that the user is authorized to respond relative to the alarm.

According to embodiments, the user can also, via the user device 40, initiate a transmission to the server portion 30 and/or the premises portion 15. For example, the user may wish to view the status of a portion of the monitored premises. Therefore, the user can interactively transmit commands to the premises portion 15 causing one or more cameras to capture images, and/or causing the SSMG 4 to transmit images to the user device 25 for viewing at the display module 43. Such images can be captured and stored for later viewing, or can be viewed in substantially real time, subject only to signal transmission and/or processing latencies. Alternatively, the user may wish to alter configuration parameters and/or alter the operational status of the alarm system. Therefore, the user initiates via the user device 25 either a one-way transmission or an interactive session with the premises portion 15, sending data including commands to affect such alterations, and perhaps receive confirmation data in return. Likewise, the user can remotely alter configuration parameters stored at the server portion 30 in a similar fashion. In either situation, the user can transmit a password and/or unique identification code to confirm that the user is authorized to affect the indicated actions.

Emergency Response Service Portion

Referring again to FIG. 2, and as also described above regarding the server portion 30 of FIG. 3, upon receiving verification of a valid alarm from a user, or alternatively upon expiration of a pre-determined duration of time without receiving a response from the user, the server portion 30 transmits a signal to an emergency response service 27. As with other transmitted signals according to embodiments of the invention, the signal can be transmitted either wirelessly or by a wire 26, and can utilize any of numerous transmission formats and/or communication means. Additionally, such transmission means may include voice communications as a viable method in embodiments. The emergency response service 27 will also possess signal receiving means, such as web-enabled devices, mobile computers with wireless capabilities, servers, or means capable of receiving and processing an alarm signal. Additionally, such receiving means may include voice communications.

The transmitted signal can include a pre-configured message, configured for example at least in part by the end user, the server portion 30 (e.g., a host 38), or the emergency response service 27. The message can include information to direct a particular response, to identify the location of the monitored premises, to indicate the nature of the detected alarm and/or emergency, and/or other information useful to an emergency response service to affect a rapid and appropriate response (e.g., sending the fire department in response to a fire).

In addition to transmitting a signal including a message, the server portion 30 will also, in embodiments, transmit as part of the initial signal and/or as a separate signal, data corresponding to captured images. At the emergency response service 27, a responder can, in an embodiment, view the images at a display device, and can therefore better understand the nature of the alarm condition. For example, if the images depict an armed intruder, the responder at the emergency response service can dispatch a SWAT team to the monitored premises, and can further cause evacuation of the surrounding area. Further, because the emergency response service can include, in embodiments, mobile emergency response service vehicles and/or personnel, the server portion can transmit validated alarm signals and images directly to mobile responders. This capability provides unique capabilities for efficiently, appropriately, and effectively responding to an alarm at a monitored premises, and managing such response.

A user, while transmitting signals including instructions to cause the premises portion 15 to capture and transmit real-time images, can further cause the real-time images to be transmitted through the server portion 30 to the emergency response service 27. This provides real-time image-based monitoring of the monitored premises 20 by the emergency response service 27 before, during, and/or after a response to an alarm.

Alarm System Data Flow

Figure 5:
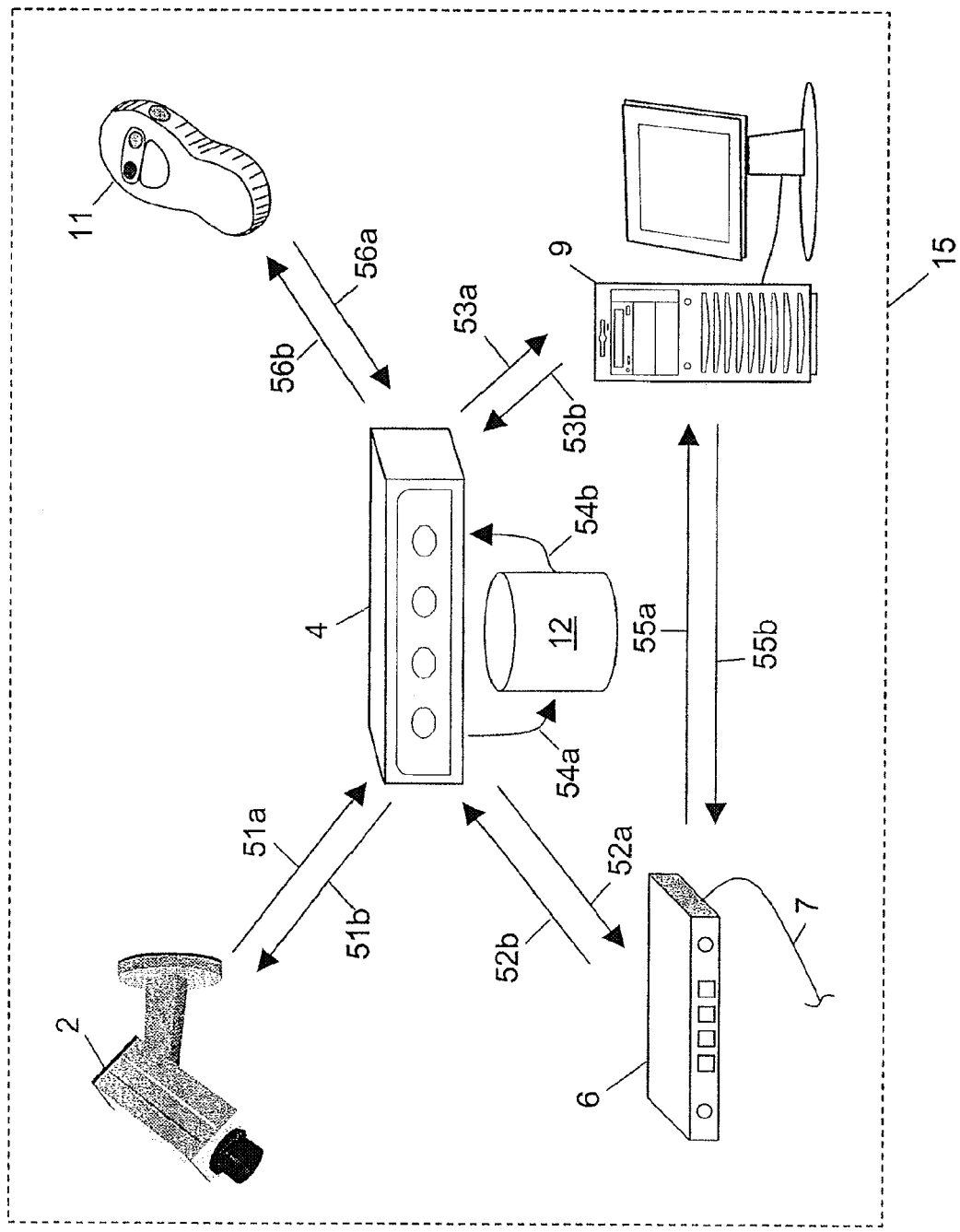
FIG. 5 depicts an iconic diagram of data flow pathways within a premises portion of an alarm system according to an embodiment of the invention.
Figure 6:
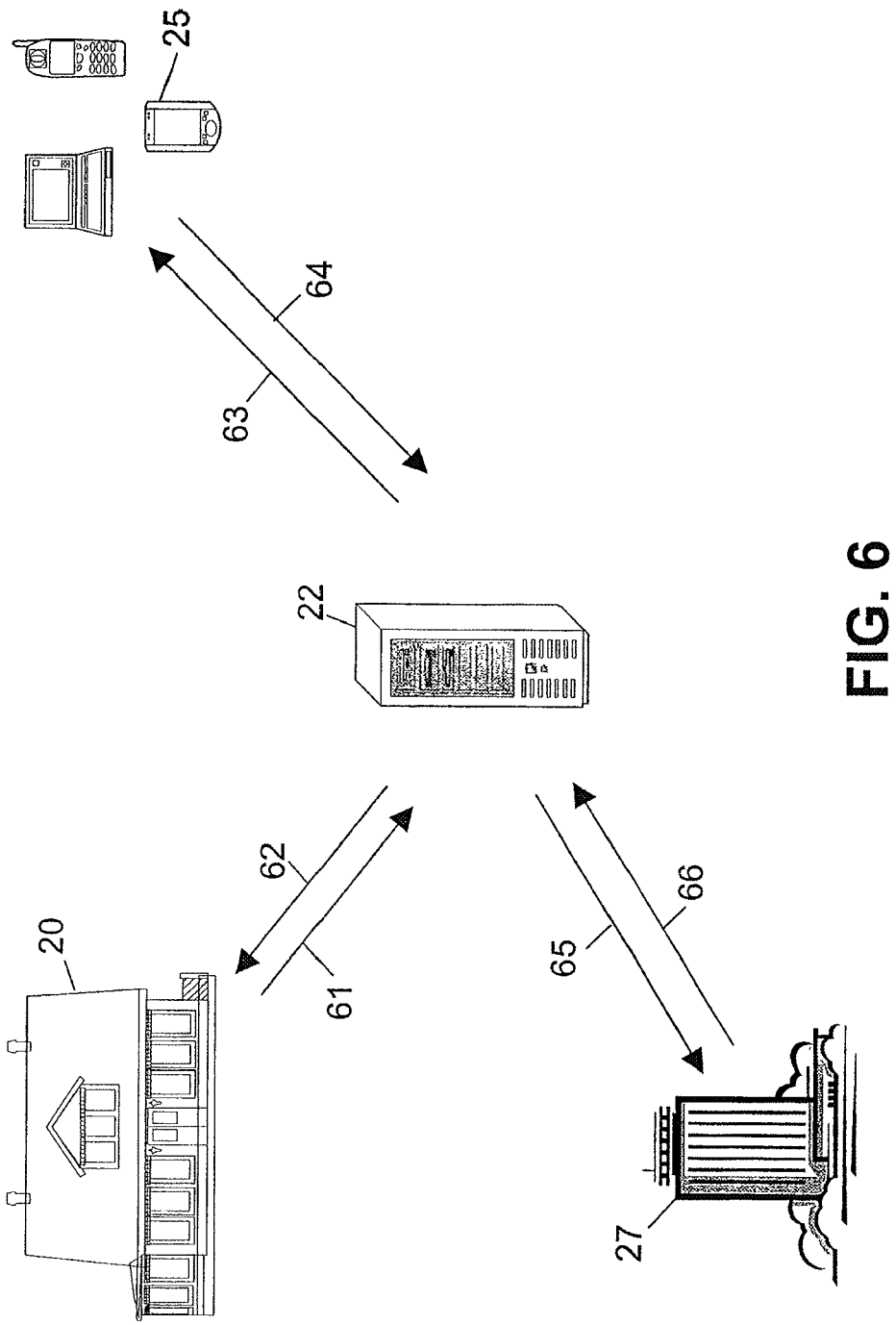
FIG. 6 depicts an iconic diagram of data flow pathways throughout an extended portion of an alarm system according to an embodiment of the invention.

FIGS. 5 and 6 provide an overview of data flow pathways in the premises portion and the extended alarm system, respectively, that occur in embodiments of the invention. Although not every function or embodiment involves signals traversing every possible data flow pathway, the pathways are depicted in a relatively consolidated form for simplicity.

With reference to FIG. 5, signals transmitted from a camera 2 to SSMG 4 follow pathway 51a. These signals typically include captured images. Conversely, signals from the SSMG 4 to a camera 2 traverse pathway 51b, and may include instructions for controlling a camera.

The SSMG 4 may then transmit a signal to, for example a router 6 along pathway 52a for subsequent transmission by, for example router 6 to a server 22 (see FIG. 2). Signals received from a server portion 30 and/or a user device 25 will traverse pathway 52b, in embodiments, from the router 6 to the SSMG 4. In embodiments wherein the router 6 is integrated within the SSMG 4, these pathways likewise occur internally within the SSMG 4.

Pathway 53a from the SSMG 4 to the local computer 9 can convey data corresponding to images for storage at a storage means of the local computer 9. Pathway 53b 4 typically conveys one or more stored configuration parameters from the local computer 9 to the SSMG, among other data types.

Pathway 54a conveys, among other things, images from the SSMG 4 to a data storage means 12, while pathway 54b conveys data from the storage means 12 back to the SSMG 4, such as to provide the user the ability to review stored images.

Pathways 55a and 55b convey data between the router 6 and the local computer 9, and as described above relative to the SSMG 4, when router 6 is integrated within the local computer 9, or the SSMG 4 itself, according to an embodiment, pathways 55a and 55b exist within the local computer 9, or alternatively are integrated within the SSMG 4. Each of pathways 55a and 55b can typically, but not exclusively, convey transmission parameters and/or images, but are not so limited.

Pathway 56a conveys a signal from a portable, wireless signal transmitter 11 to the SSMG 4, such as to alter an alarm system activation status. A signal conveyed from SSMG 4 to the portable transmitter 11 along pathway 56b can confirm an activation status of the alarm system, and through a logic circuit and/or device within the transmitter 11, cause an LED on the transmitter 11 to illuminate.

The depicted pathways of the premises portion 15 in FIG. 5 are not, however, exclusive, and additional and/or alternate pathways are included within the scope of the invention according to alternate embodiments. Such embodiments may include integration of elements within the premises portion. For example, the local computer 9 and the SSMG 4 may be integrated in an embodiment, and the signal pathways 53a and 53b may take place entirely within the integrated device. Further, depending upon the configuration of the integrated device, pathways 53a and 53b may not exist in a separate and significant form. Other elements and/or devices within the premises portion 15 may likewise be integrated, or additional elements may indicate the presence of additional pathways. For example, an added peripheral device (e.g., printer) could be coupled in communication with data storage means 12, and signal pathways would exist between them for conveying data for storage and/or retrieval, according to an embodiment. Therefore, the signal pathways depicted in FIG. 5 are for illustrative purposes, and are not intended to limit the scope of embodiments of the invention.

Turning now to FIG. 6 depicting the signal pathways of the invented alarm system beyond the premises portion, signal pathway 61 conveys signals from the monitored premises 20 (and premises portion 15) to a central server 22, for example in response to an intrusion detection, and pathway 62 conveys signals from the server 22 to the premises 20, such as when the end user wishes to control a camera 2 to obtain a real-time image.

Pathways 63 and 64 convey signals between the server 22 and an end user device 25, such as detection signal 24a and verification signal 24b, respectively.

Pathway 65 conveys signals from the server 22 to the emergency response service 27, as when reporting a verified valid alarm. Pathway 66, in an embodiment, conveys a confirmation signal from the emergency response service 27 to the server 22, confirming that the alarm signal has been received.

These signal pathways described herein are not exclusive, nor are the types of data, signals or transmission means provided above in describing exemplary embodiments.

An Exemplary Alarm Method Embodiment

With reference to FIG. 7, a simplified description of an embodiment of the invented alarm system method is provided below for additional clarity, from the perspective of an end user employing the alarm system.

At 71, the alarm system captures image data and transmits a first signal to the SSMG. The SSMG receives the first signal, and transmits a second signal to a server portion, at 72, and then at 73, the server portion receives the second signal, and transmits a third signal to a device of the end user. The end user device receives the third signal, and at 74, the user views image data of the third signal at a display of the end user device. At 75, the end user inputs validation data (e.g., "Valid Alarm", "Invalid Alarm"), and transmits a fourth signal from the end user device to the server portion. The server portion, at 76, receives the fourth signal, and if the fourth signal includes data indicating that the alarm is valid, the server portion transmits an alarm signal to an emergency response service. At one or more of the operations depicted at 72, 73, and/or 74, image data is stored, as shown at 77.

Associated with one or more of the operations of the embodiment depicted in FIG. 7, as well as other embodiments, signals are transmitted, modified, augmented, processed, and otherwise handled according to configuration parameters, at least a subset of which, and generally most of which, are predetermined, for example by the end user. Other configuration parameters are determined relatively contemporaneously with the receipt or transmission of signals, as determined by data associated with the signal and/or other predetermined configurations parameters.

Alternative Embodiments

An end user device 25 is typically maintained in the possession of the end user, and therefore it is the end user who receives and verifies the validity of detected alarm events. However, there may also arise any of a wide variety of situations when, for example, the end user is unable to receive transmitted signals from the server portion 30 (e.g., out of transmission range) or it is otherwise inconvenient or impossible for the user to receive and/or verify alarm events. Therefore, the user can designate an alternate trusted entity to receive and verify detected alarm events, and the trusted entity will be considered a user according to the embodiments described and contemplated herein. For example, a trusted entity can be a friend, a family member, an agent or employee, or a commercial service, although the embodiments are not so limited, and can include nearly anyone designated by the user and/or another authorized entity.

Further, a user device 25 includes whatever device a user employs to carry out the functions of a user device 25 as described above. Inasmuch as a user (or a trusted entity as user), while being remote from a monitored premises 20 and a server 22, may be connected with the server 22 by a wired connection, signals 24a and 24b can be exchanged with (e.g., transmitted to, received from) the trusted entity's user device 25 by wire (as broadly described above). Likewise, the user device 25 is not limited to being a portable, wireless device (e.g., PDA, mobile telephone), but can also be a personal or desktop computer or any other device operably coupled, whether persistently or intermittently, in communication with a server 22 or with at least one module of server portion 30.

An alarm system can include more than one level of user permissions (e.g., authority, access, control), and a trusted entity may not be given all the same levels of control of an alarm system permitted to an end user. For example, the trusted entity may not, according to a level of authority granted by the end user, be able to alter some or all of the configuration parameters of an alarm system, such as altering passwords or accessing stored image data. Therefore, while providing a proxy "end user" to verify the validity of detected alarms, an end user can retain control over at least some aspects of system configuration and/or function.

In various embodiments, signals transmitted between a premises portion 15, a server portion 30, an end user device 15, and an emergency response service 27, each of which is broadly described herein, can be conveyed according to any one of or combination of communication structures. For example, and as described, any of the signals described herein can be transmitted either wirelessly or by a wired connection according to embodiments, and no limitation to either one or the other is intended herein. Therefore, symbols used in the figures to represent signal conveying means 21 and 24 in FIG. 2, for example, are not intended to limit either signal conveying means as being wire or wireless. The depicted symbols could just as easily and accurately be transposed in the figures to represent alternative contemplated embodiments.

Examples of wireless communication structures can include commercial cellular telephone networks, Wi-Fi and/or WiMAX networks, satellite communication networks, publicly available radio frequencies, or proprietary (e.g., military, industrial) wireless communication networks, although the embodiments are not so limited. Likewise, wired communication structures can include fiber optic networks, cable (e.g., cable television and broadband) networks, telephone networks (e.g., PSTN and DSL), and others capable of carrying a communication signal.

Any one or more of the signals transmitted within embodiments of the system, whether by wireless or wired transmission means, can be transmitted in a secured manner, by use of, for example, data and/or signal encryption, frequency modulation, coded ciphers, or any other method and/or means available for use with public and/or private signal transmission devices, networks, protocols, or communication formats.

In light of the described embodiments provided above, a person having ordinary skill in the art will recognize numerous advantages provided by embodiments of an automated, remotely-verified alarm system with intrusion and video surveillance, and digital video recording.

The present invention, according to one or more embodiments, provides a self-monitored alarm verification solution for visually identifying the root cause of alarm events, relatively directly and immediately, while utilizing modern high-speed Internet, phone networks, or private networks and web-enabled devices for self-monitoring. It also provides a self-monitored alarm verification solution that will visually record an alarm event at a premise location utilizing any combination of a camera (PIRCam) or separate PIR or other sensor and separate camera, or motion-sensing camera to make available images of the alarm events to be validated remotely by the end-user.

The described system includes an alternate power source in case a primary power source is interrupted, and also includes alternate power sources for remotely located image capture devices providing a high degree of flexibility in their placement and configuration. Embodiments include either and/or both of wired or wireless signal transmission, and are modular enough and simply enough to use that they can be installed either by a professional installer or by an end user and/or premise owner.

Embodiments of the system capture and temporarily store alarm event images, and also securely transmit said images to an off-site location where they can be retrieved and viewed by an end user utilizing any web-enabled device. Further, embodiments of the invented system enable tremendous variability and flexibility to utilize communication, transmission, and data formats, devices, and/or modes, as would be most useful, reliable, affordable, and available in the situation of each particular end user. For example, the described system can interface with and communicate over any public network, Internet, phone network, or private network, although other networks may also be alternatively utilized.

The system can be enabled ("armed") and disabled ("disarmed") remotely or within the premise via either the use of the SSMG, a local PC connected to the SSMG or by a wireless transmitter key fob that communicates with the SSMG, or by a remotely located user device. Also, the system can include a local PC at the premise or located remotely, that configures the SSMG and central server configuration parameters. Such parameters can include communication method selections, alarm event thresholds, and contact information for the end user and/or law enforcement agencies, although the embodiments are not so limited.

Software on the central server can also generate a plurality of communication methods including email, web-site hosting, SMS messaging, MMS messaging, network protocols, and/or text-to-speech communication. Therefore, the central server can utilize a plurality of communication methods with both the end-user's premise, the end-user's remote device, and law-enforcement agencies.

Through the use of secure communication, directly conveyed from a premises to a central server and then to an end user, the system enables an alarm verification method providing both relative immediacy and privacy. The delays and involvement typical of a third party alarm monitoring service are eliminated in embodiments, and the likelihood of false alarms is greatly reduced.

Other advantages are enabled by the tremendous flexibility and modularity of the described alarm system to render virtually innumerable embodiments. Accordingly, although the system is depicted and embodied in only a limited number of forms in the accompanying drawings, the drawings are illustrative only, and changes can be readily made by one having ordinary skill in the art according to the descriptions provided above.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

I claim:

1. A system, comprising:
    an image analysis module implemented in at least one of a memory or a processing device, the image analysis module configured to receive image data associated with a monitored premise, the image analysis module configured to analyze the image data according to a set of configuration parameters to automatically detect an event; and
    a signal transmission module configured to send a signal associated with the event and in accordance with a set of user-defined transmission parameters in response to the event being from a set of predetermined events such that a user can view an image associated with the event using a user device remote from the monitored premise,
    the signal transmission module configured to send a representation of the imae data to a storage module to be stored for a time period such that the user can access the representation of the image data during the time period.

2. The system of claim 1, wherein the image data is captured by an image capture device separate from the image analysis module.

3. The system of claim 1, wherein the signal transmission module is configured to modify the user-defined transmission parameters based at least in part on and in response to a signal received and associated with the user.

4. The system of claim 1, wherein at least one of the image data or the signal is encrypted.

5. The system of claim 1, wherein the signal associated with the event is a first signal, the signal transmission module configured to send a second signal associated with the event in response to a request from the user device.

6. The system of claim 1, wherein the signal represents at least one of an image associated with the event, a time associated with the event, or an image capture device identifier associated with the event.

7. The system of claim 1, wherein the signal is a first signal, the signal transmission module configured to send the first signal via a first tranmission method in accordance with the set of user-defined transmission parameters, the signal transmission module configured to send a second signal associated with the event via a second transmission method different from the first transmission method in accordance with the set of user-defined transmission parameters.

8. The system of claim 1, wherein the signal transmission module is configured to send the signal via at least one of a short message service (SMS) message or an electronic mail (e-mail) message.

9. The system of claim 1, wherein the signal represents auditory data associated with the monitored premise.

10. The system of claim 1, wherein the image data is first image data, the event is a first event, the signal is a first signal,
    the image analysis module configured to receive the first image data at a first time, the image analysis module configured to receive, at a second time after the first time, second image data associated with the monitored premise, the image analysis module configured to analyze the second image data according to the set of configuration parameters to automatically detect a second event different than the first event;
    the signal transmission module configured to send a second signal associated with the second event and in accordance with the set of user-defined transmission parameters in response to the second event being from the set of predetermined events such that the user can view an image associated with the second event using the user device remote from the monitored premise.

11. The system of claim 1, wherein the image data is encrypted, the signal represents at least one of (1) an image associated with the event, (2) a time associated with the event, or (3) an image capture device identifier associated with the event, the signal transmission module configured to send the signal via at least one of a short message service (SMS) message or an electronic mail (e-mail) message.

12. The system of claim 1, further comprising:
    an image capture device configured to capture the image data, the image capture device configured to send the image data to the image analysis module via a network.

13. A non-transitory processor-readable medium storing code representing instructions to be executed by a processor, the code comprising code to cause the processor to:
    receive, from an image capture device, image data associated with a monitored premise;
    analyze the image data according to a set of configuration parameters to automatically detect an event;
    send a signal associated with the event to notify a user of the event such that the user can view a notification of the event using a user device remote from the monitored premise and in accordance with a set of user-defined transmission parameters in response to the event being from a set of predetermined events; and
    send to a storage module remote from the user device- representation of the image data associated with the monitored premise to be stored for a time period such that a user can access the representation of the image data during the time period.

14. The non-transitory processor-readable medium of claim 13, wherein the signal represents motion sensed at the monitored premise.

15. The non-transitory processor-readable medium of claim 13, wherein the code to cause the processor to send the signal associated with the event includes code to cause the processor to send the signal via at least one of a short message service (SMS) message or an electronic mail (e-mail) message.

16. The non-transitory processor-readable medium of claim 13, wherein the signal represents at least one of an image associated with the event, a time associated with the event, or an identifier of the image capture device associated with the event.

17. The non-transitory processor-readable medium of claim 13, wherein the signal includes at least a portion of the image data associated with the monitored premise.

18. A method, comprising:
   receiving, (1) at an image analysis module implemented in at least one or a memory or a processing device, and (2) from an image capture device, image data associated with a monitored premise;
   analyzing the image data according to a set of configuration parameters to automatically detect an event from a set of predetermined events;
   sending a signal associated with an image captured during the event such that a user can access a representation of the image captured during the event using a user device remote from the monitored premise; and
   sending a representation of the imagine data associated with the monitored premise to a storage module to be stored for a time period such that the user can access the representation of the image data during the time period.

19. The method of claim 18, wherein the sending the signal includes sending the signal via at least one of a short message service (SMS) message or an electronic mail (e-mail) message.

20. The method of claim 18, wherein the image data associated with the monitored premise is encrypted, the method further comprising:
   sending a signal representing auditory data associated with the monitored premise.

21. The method of claim 18, further comprising:
   receiving a request for a current image associated with the monitored premise; and
   sending, in response to the receiving the request, a substantially current image associated with the monitored premise.

22. The method of claim 18, wherein the sending the signal includes sending the signal such that the user can verify the event using the representation of the image.

\* \* \* \* \*

UNITED STATES PATENT AND TRADEMARK OFFICE
CERTIFICATE OF CORRECTION

PATENT NO.        : 9,208,666 B2
APPLICATION NO.   : 14/323624
DATED             : December 8, 2015
INVENTOR(S)       : Randall R. Jackson It is certified that error appears in the above-identified patent and that said Letters Patent is hereby corrected as shown below:

In the Claims

Claim 1, (column 21, line 40) change "imae" to --image--.

Claim 7, (column 21, line 62) change "tranmission" to --transmission--.

Claim 18, (column 23, line 16) change "imagine" to --image--.

Signed and Sealed this
Twenty-second Day of March, 2016

Michelle K. Lee
*Director of the United States Patent and Trademark Office*